(12) United States Patent
Egusa et al.

(10) Patent No.: US 6,618,545 B1
(45) Date of Patent: Sep. 9, 2003

(54) DIGITAL DATA RECORDING AND REPRODUCING APPARATUS

(75) Inventors: Yo Egusa, Kyoto (JP); Yutaka Ota, Nayagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/419,284

(22) Filed: Oct. 15, 1999

(30) Foreign Application Priority Data

Oct. 16, 1998 (JP) .......................................... 10-294942

(51) Int. Cl.$^7$ .............................. H04N 5/91; H04N 7/00
(52) U.S. Cl. .......................................... 386/46; 386/83
(58) Field of Search ................................ 386/46, 83, 1, 386/52, 55, 4, 40, 81, 95, 124; 360/32, 13, 55; H04N 5/91, 7/00

(56) References Cited

U.S. PATENT DOCUMENTS 5,541,738 A * 7/1996 Mankovitz
5,703,994 A * 12/1997 Lee et al.

FOREIGN PATENT DOCUMENTS

WO    WO 94/16441    7/1994

* cited by examiner

Primary Examiner—Robert Chevalier
(74) Attorney, Agent, or Firm—McDermott, Will & Emery

(57) ABSTRACT

A digital recording and reproducing apparatus comprising a cassette number registering circuit (1) for applying different CIDs for respective cassettes, a corresponding control circuit (7) for searching, adding and deleting program data, a cassette number inserting circuit (2) for inserting a CID in the form of a digital signal into the VBI of an analog video signal, a cassette number extracting circuit (3) for extracting a CID from a VBI, magnetic recording and reproducing means (4) for recording and reproducing the analog signal by using a magnetic tape (50), a display number registering circuit (5) for applying an AID which corresponds to a CID and is recognized by a user, a memory circuit (6) for storing program data including a CID, an AID, a starting tape position, an ending tape position and recording start date, a program integrating circuit (76) which makes one AID corresponds to a plurality of CIDs, and, keeps programs having later date and deletes programs having older date when the recorded magnetic tape positions of the recorded programs under the plurality of CIDs overlap. The above structure enable amendment when a plurality of CIDs are registered for one cassette by mistake. In integration, an AID of smaller number is selected. (FIG. 8)

2 Claims, 14 Drawing Sheets

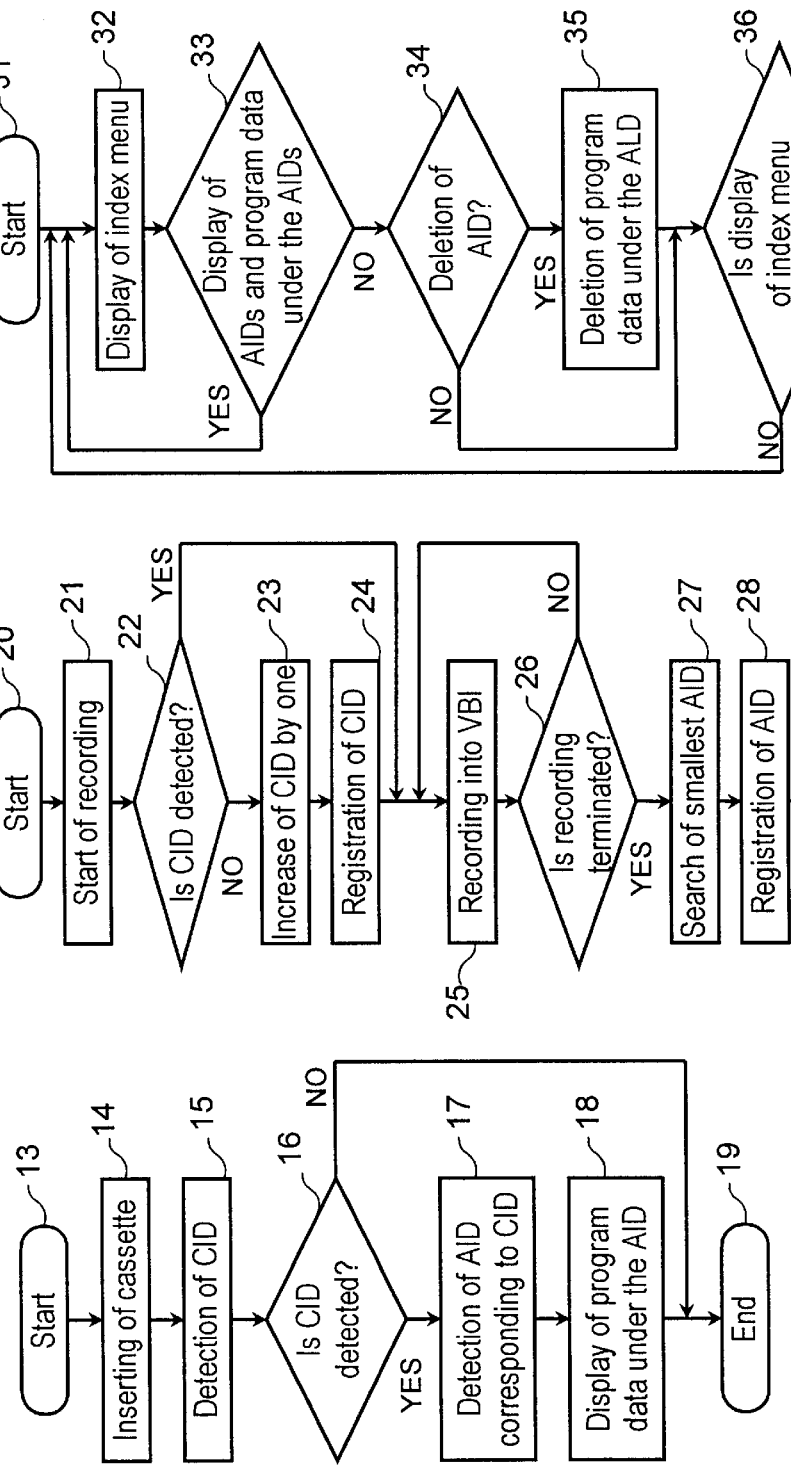

| No.4 | |
|---|---|
| Title | Date |
| Movie | 02.01.97 |
| CNN NEWS | 03.02.97 |
| ZDF NEWS | 03.02.97 |

FIG. 10A
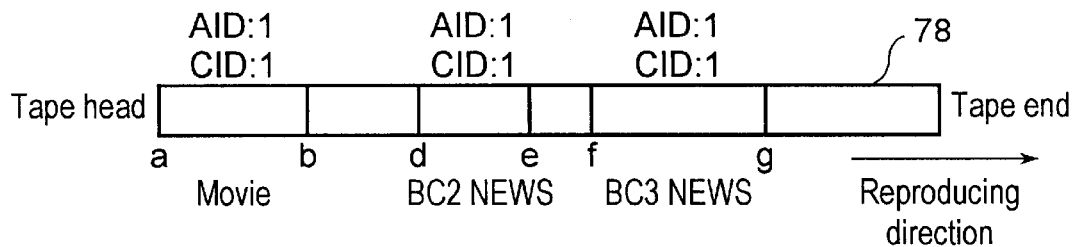
FIG. 10B
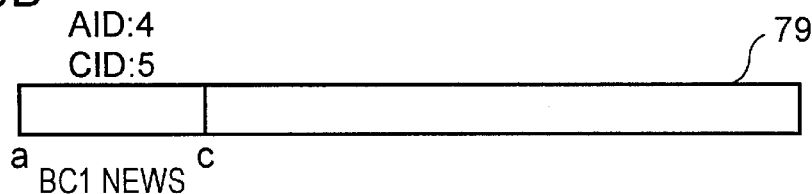
FIG. 10C
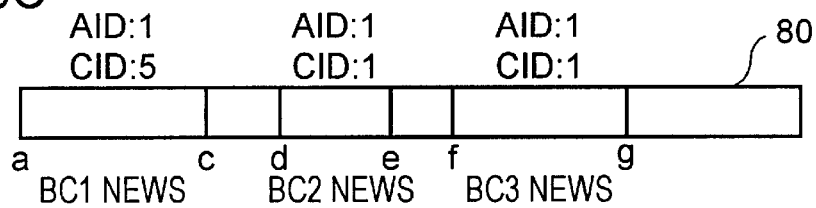
FIG. 10D
| No.1 | |
|---|---|
| Title | Date |
| BC1 NEWS | 15.05.97 |
| BC2 NEWS | 03.02.97 |
| BC3 NEWS | 03.02.97 |

DIGITAL DATA RECORDING AND REPRODUCING APPARATUS

FIELD OF THE INVENTION

The present invention relates to an apparatus for processing digital data in a vertical blanking interval (hereinafter referred to as VBI) which is used as a character data inserting region of a video signal, in a video tape recorder (hereinafter referred to as VTR).

BACKGROUND OF THE INVENTION

A conventional VTR which has the function of processing digital data in the VBI of an analog video signal is, for example, disclosed in Japanese Laid-open Patent No. H8-505729.

FIG. 14 is a block diagram showing the structure of the conventional digital data recording and reproducing apparatus. The apparatus comprises a tuner 202 for demodulating a broadcasting radio wave received through an antenna 201 into an analog video signal, a VBI decoder 203 for demodulating a digital signal existing in the VBI of the analog signal of a broadcasting television signal and a digital signal existing in the VBI of an analog video signal reproduced from a magnetic tape into character data, a VBI encoder 204 for producing a digital signal from character data for recording into a magnetic tape, a VTR control circuit 205 for controlling the drive of a VTR, a microprocessor control device 206 for general control of the VTR, a RAM (random access memory) 207 for storing character data, a motor and mechanism control circuit 208 for driving the hubs of a cassette 215, a video circuit 209 for recording and reproducing an analog video signal, a position counter 210 for detecting a tape position from the rotation of a pinch roller 214 which drives a magnetic tape 213, and a transformer coil 212 through which a signal is given and received to and from a video head mounted in a video head drum 211 which rotates the video head helically against the magnetic tape 213.

The operation of the above conventional apparatus is described hereinafter. In the apparatus, the title of a program to be recorded is extracted from the VBI of the analog video signal of a broadcasting television signal and stored in the RAM207. On the other hand, a cassette number in form of a digital signal is inserted into the VBI of the analog video signal to be recorded. And the cassette number is extracted at the occasion of reproducing the recorded video signal. By the above arrangement, the program title corresponding to the cassette number is selected and displayed on a television screen. More details are as follows.

(1) A user sets for recording reservation with a timer of the VTR. (2) During the recording, a cassette number in the form of a digital signal is inserted into the VBI of an analog video signal and recorded together with an video signal. (3) During the recording or in advance to the recording, a program title is extracted from the VBI of the analog video signal of a broadcasting radio wave and stored in the RAM 207 together with the cassette number and recording start position data on a magnetic tape. (4) At the stage of taking out the cassette from the VTR after finishing the recording, the user can recognize the cassette number on a television screen and can write by hand the cassette number on the label of the cassette. (5) The user inserts the cassette into the VTR to see the recorded program. (6) The VTR automatically works for reproducing on the magnetic tape for a few seconds and extracts the cassette number recorded in the VBI. (7) The program title corresponding to the cassette number is read out from the RAM 207 and displayed on a television screen together with the cassette number. (8) The recording start position in the magnetic tape on the program having the title selected by the user is read out from the RAM 207, and, the magnetic tape is first-forwarded or rewinded and set at the starting position of the selected program for reproduction. Also, by displaying cassette numbers and program titles stored in the RAM 207 on a television screen, a cassette in which a desired program is recorded can be found out.

FIG. 15(a) shows a conventional signal recorded in a VBI. The signal comprises a horizontal sync signal (HSYNC) 216, a color burst signal 217 for showing reference color phase, a clock run-in signal 218 for adjusting phase at the occasion of reading out a digital signal, a frame code signal 219 for identifying the starting position of the digital signal, and a two-byte (16-bit) digital signal 220 to be recorded.

FIG. 15(b) shows digital data recorded in the VBI. The digital data comprises a start code 221 for showing the starting position of a data row, a type code 222 for identifying the contents of the data row, data contents 223, an end code 224 for showing the end of the data contents 223, and check sum 225 for finding data error which occurs in recording and reproduction. As shown in FIG. 15(a), two bytes each of the data row shown in FIG. 15(b) are recorded in one horizontal scanning line of the VBI. In this case, the line number for the recording is predetermined. In reproduction, the whole digital data are read out by detecting start code 221 and the end code 224 of the predetermined line number.

However, the conventional structure described above, in which cassette numbers recorded in magnetic tapes are same with the numbers which are recognized by a user, has the following inconvenience. That is, when a user gives an instruction, on the display of a television screen, for deleting a certain program number which is registered for a cassette, the program data in the RAM 207 under the program number, which corresponds to the program data in the cassette under the same cassette number, is deleted from the memory of the RAM 207. However, the cassette number and the program data of the corresponding cassette are not deleted unless the user deletes these from the cassette. Therefore, when the program number which is deleted from the RAM207 is applied for recording a new program by using a new cassette, the same program number comes to exist in the VBIs of the magnetic tapes of the two or a plurality of different cassettes. Although the above inconvenience is prevented by applying different numbers for respective cassettes, the numbers increases, which creates another inconvenience of the difficulty of finding a desired program. The numerals of cassette numbers is better to be as small as possible for a user.

Also, there is a case that a plurality of cassette numbers are registered on one cassette by mistake, which is caused when the recording is performed in the state that the cassette numbers are failure in read after the cassette is inserted into the VTR or in the state that the VTR is erroneously operated. That is, when the recording is performed in such erroneous states, an improper cassette number is given and recorded into the magnetic tape, which results in the existence of a plurality of cassette numbers on one cassette. Although the cassette number can be corrected by a user in the case of erroneous loading of the cassette number, it is troublesome and not preferable.

SUMMARY OF THE INVENTION

The present invention addresses the above conventional problems and aims to provide a digital data recording and reproducing apparatus which solves the conventional problems with simple structure and registers a cassette number in a magnetic tape.

For realizing the above aim, the digital data recording and reproducing apparatus of the invention comprises a cassette number registering circuit for applying different cassette numbers for respective cassettes, a cassette number inserting circuit for inserting a cassette number in the form of a digital signal into the VBI of a video signal, a cassette number extracting circuit for extracting a cassette number from the VBI of a video signal, magnetic recording and reproducing means for recording and reproducing a video signal by using a magnetic tape, a display number registering circuit for searching out the smallest number from unused display numbers and applying the number as a new display number which corresponds to a new cassette number and is recognized by a user, a storing circuit for storing program data including the cassette number and the display number, a correspondence control circuit for searching, adding and deleting the program data.

The above structure enable that a cassette number recorded in a magnetic tape corresponds to a display number which can be recognized by a user on a television screen. Also, by registering a cassette number which is larger by one than the numbers used in the past for a new cassette, it is prevented that a plurality of cassettes have a same cassette number. Furthermore, by selecting the smallest number from the unused display numbers, deleted numbers can be used again. By using small display numbers, the handling of the program data becomes easy for a user. Also, it is advantageous that when a user deletes a display number registered for a cassette, the program data stored in the memory circuit, which is the same program data in the corresponding cassette, can also be deleted.

BRIEF DESCRIPTION OF THE DRAWINGS

FIGS. 3A–3C show processes for displaying, registering and deleting an AID (application identification number) and program data under the AID in the first exemplary embodiment of the invention.

DESCRIPTION OF THE PREFERRED EMBODIMENTS

Hereinafter exemplary embodiments of the present invention are described referring to illustrations.

First Exemplary Embodiment

Figure 1:
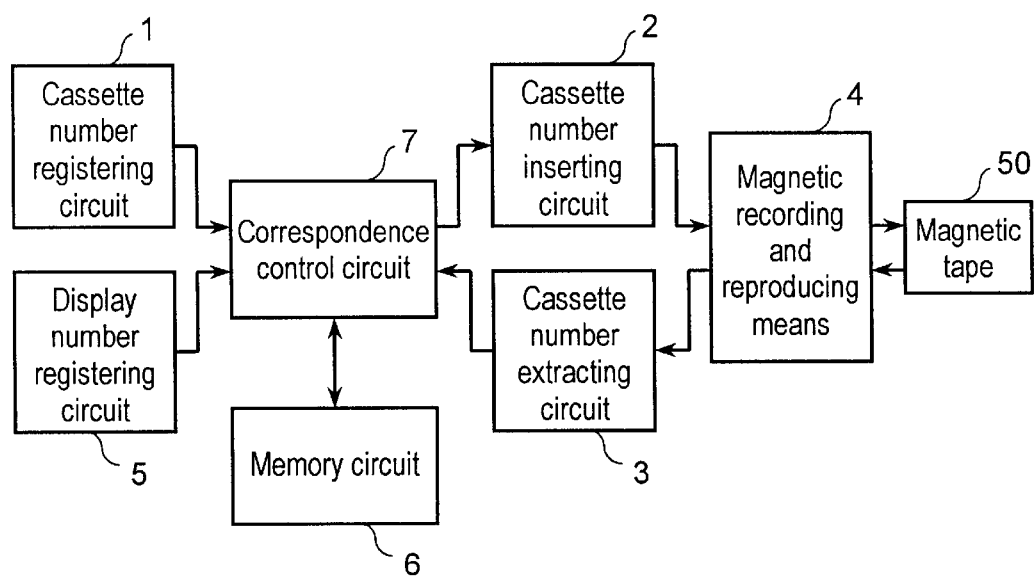
FIG. 1 is a block diagram showing the structure of a digital data recording and reproducing apparatus in a first exemplary embodiment of the present invention.

FIG. 1 is a block diagram showing the structure of a digital data recording and reproducing apparatus of a first exemplary embodiment of the present invention. The apparatus comprises a cassette number registering circuit 1 for applying different cassette identification numbers (hereinafter abbreviated as CIDs) for respective cassettes, a cassette number inserting circuit 2 for inserting a CID in the form of a digital signal into a VBI, a cassette number extracting circuit 3 for extracting a CID from a VBI, magnetic recording and reproducing means 4 (a recording and reproducing circuit and a drive, which are described later) for recording and reproducing an analog video signal by using a magnetic tape 50, a display number registering circuit 5 for searching out the smallest number from unused display numbers which are displayed on a television screen for being recognized by a user (hereinafter the display number is referred to as AID for the abbreviation of application identification number) and applying the number as a new AID which corresponds to a CID, a memory circuit 6 for storing program data including a CID and an AID, a correspondence control circuit 7 for searching, adding and deleting the program data, and a magnetic tape 50.

Figure 2:
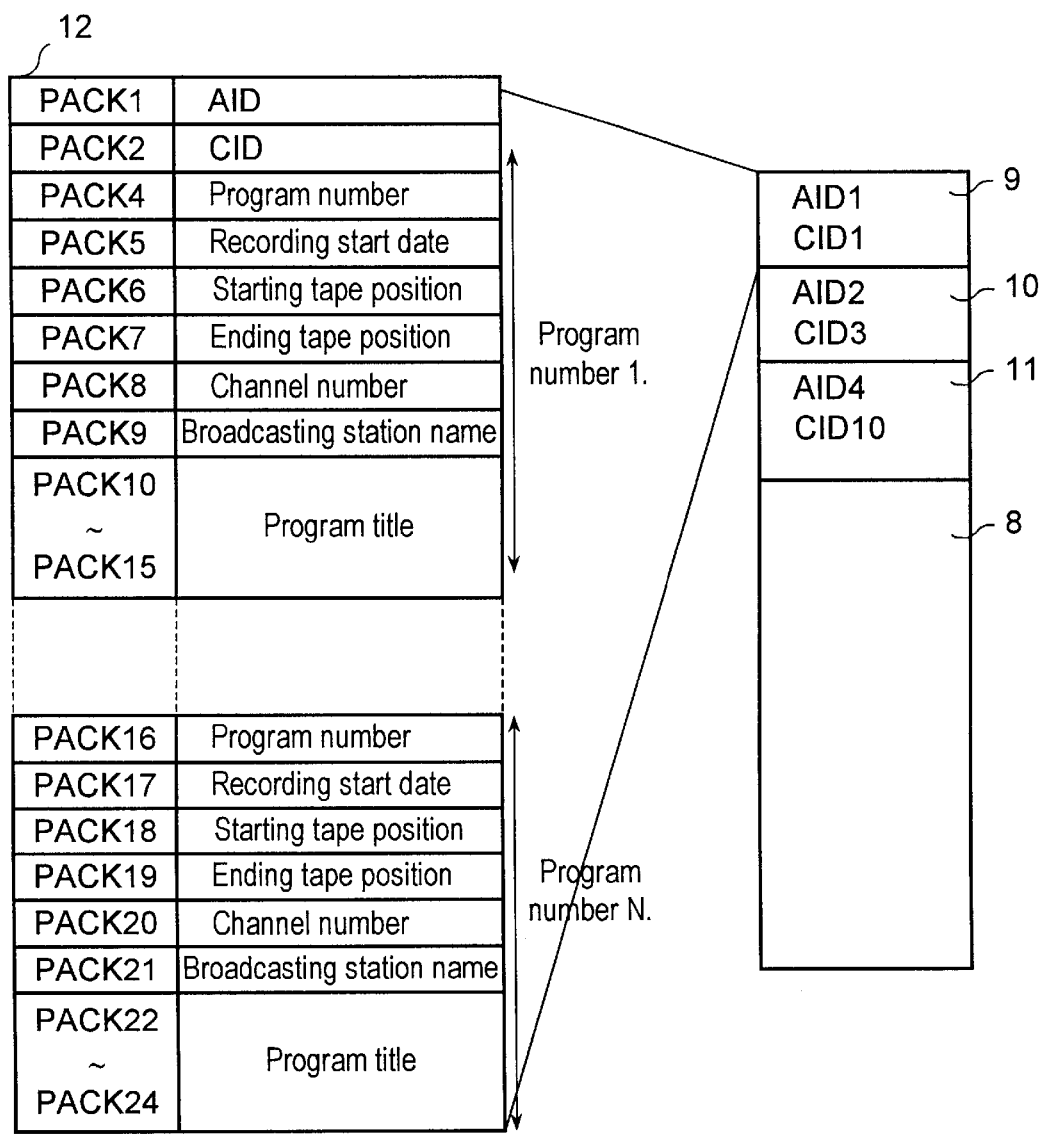
FIG. 2 shows the structure of stored contents of a memory circuit 6 in the first exemplary embodiment of the invention.

Hereinafter the operation of the apparatus having the above structure is described referring to FIG. 2 through FIG. 7. FIG. 2 shows the storing state of CIDs, AIDs and program data in the storing circuit 6. That is, in the storing region 8 of the memory circuit 6, program data 9, 10 and 11 are stored for respective cassettes, and, an example of details of the respective program data for respective cassettes is shown by program details 12, which shows that one AID, one CID, and some sets of program data comprising a program number, recording start date, a recording starting tape position, a recording ending tape position (hereinafter respectively abbreviated as "starting tape position" and "ending tape position"), a channel number, a broadcasting station name and a program title are recorded in the memory circuit 6 for each cassette.

FIG. 3 shows processes for displaying, registering and deleting an AID and program data under the AID.

FIG. 3(a) is a flow chart showing the processes for displaying an AID and the recorded program under the AID. It starts from process 13. After inserting a cassette (process 14) into the VTR, the detection of a CID in a VBI is performed (process 15) by the cassette number extracting circuit 3 under a reproduction mode. When a CID is detected, the correspondence control circuit 7 searches out an AID corresponding to the CID (process 17) from the memory circuit 6, and, displays the AID and the recorded program data under the AID on a television screen (process 18). Thus a user can check the program recorded in the cassette. When no CID is detected, the process terminates (process 19).

FIG. 3(b) is a flowchart showing the processes of registering a new AID and storing program data under the AID, in recording. It starts from process 20. Recording starts at process 21. Then, if no CID is detected in a cassette, the cassette number registering circuit 1 applies for the cassette a new CID which is larger by one than the largest CID applied in the past (processes 22, 23, 24). During the recording, the cassette number inserting circuit 2 inserts the new CID in the form of a digital signal into the VBI of an analog video signal to be recorded, and the CID in the VBI is recorded into the magnetic tape 50 (process 25) by the magnetic recording and reproducing means 4. At the end of recording (process 26), the display number registering circuit 5 searches out the smallest number from unused AIDs in the memory circuit 6, and apply the number as a new AID which corresponds to the new CID (processes 27, 28). Then the correspondence control circuit 7 adds the program data (AID, CID, program number, recording start date, starting tape position, ending tape position, broadcasting station name and program title) into the memory circuit 6 (process 29). With the above processes, the registration of a new AID and the storage of program data under the AID is completed (process 30).

FIG. 3(c) is a flow chart showing the processes of deleting an AID and program data under the AID. It starts from process 31. A user can recognize an AID and recorded program data under the AID on a television screen (process 32), also can refer to the other recorded program data by switching to the other AIDs (process 33). The correspondence control circuit 7 can delete any registered AID and recorded program data under the AID processes 34, 35). With the above processes, the deletion of an AID and the stored recorded program data under the AID is completed (processes 36, 37).

Figure 4A:
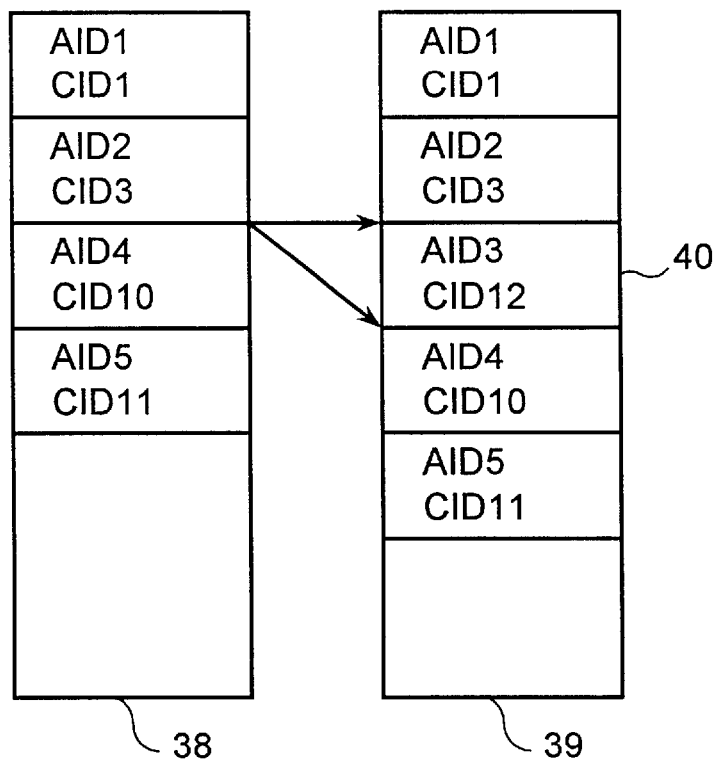
FIGS. 4A–4B are for explanation of adding and deleting a program data in the memory circuit 6 in the first exemplary embodiment of the invention.
Figure 4B:
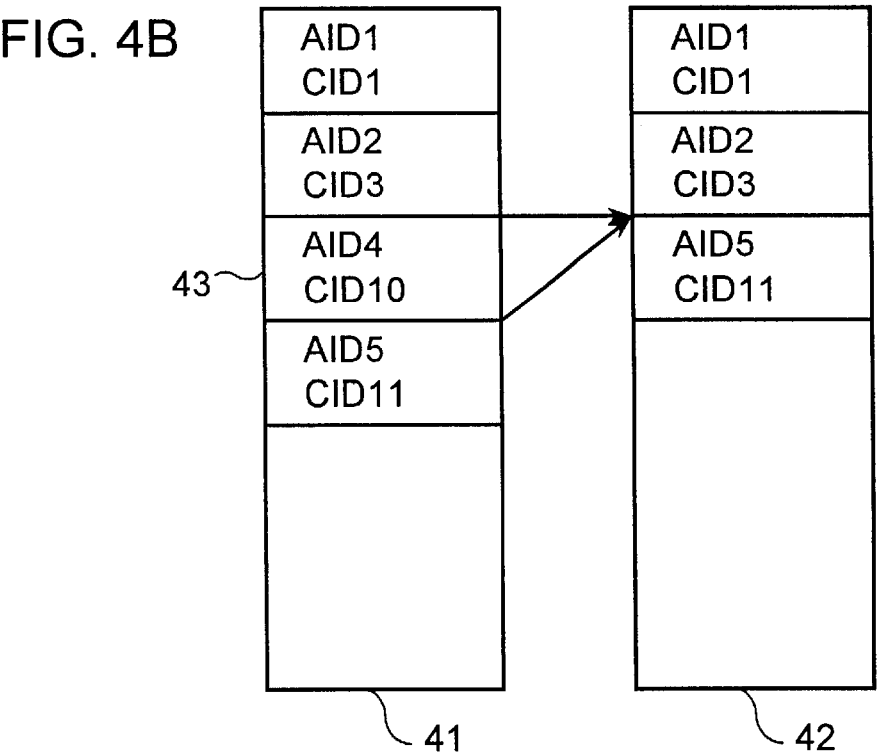

FIG. 4 shows schematically the examples of adding and deleting program data in the storing circuit 6. FIG. 4(a)-39 shows that program data 40 is added to the data of FIG. 4(a)-38. In FIG. 4(a)-38, AIDs are 1, 2, 4 and 5, and, the corresponding CIDs are 1, 3, 10 and 11. As described in FIG. 3, the smallest number of the unused AIDs and a CID which is larger by one than the stored CIDs are searched out. In this case, a number "3" for the AID and a number "12" for the CID are searched out and allocated for adding the program data "40". FIG. 4(b)-42 shows that program data 43 is deleted from the data of FIG. 4(b)-41. In FIG. 4(b)-41, as in FIG. 4(a)-38, AIDs are 1, 2, 4 and 5, and the corresponding CIDs are 1, 3, 10 and 11. In this state, when the program data 43, which has AID "4" and CID "10", is deleted as described in FIG. 3, program data having AID "5" comes up and fill in the deleted space as shown in FIG. 4(b)-42.

Figure 5:
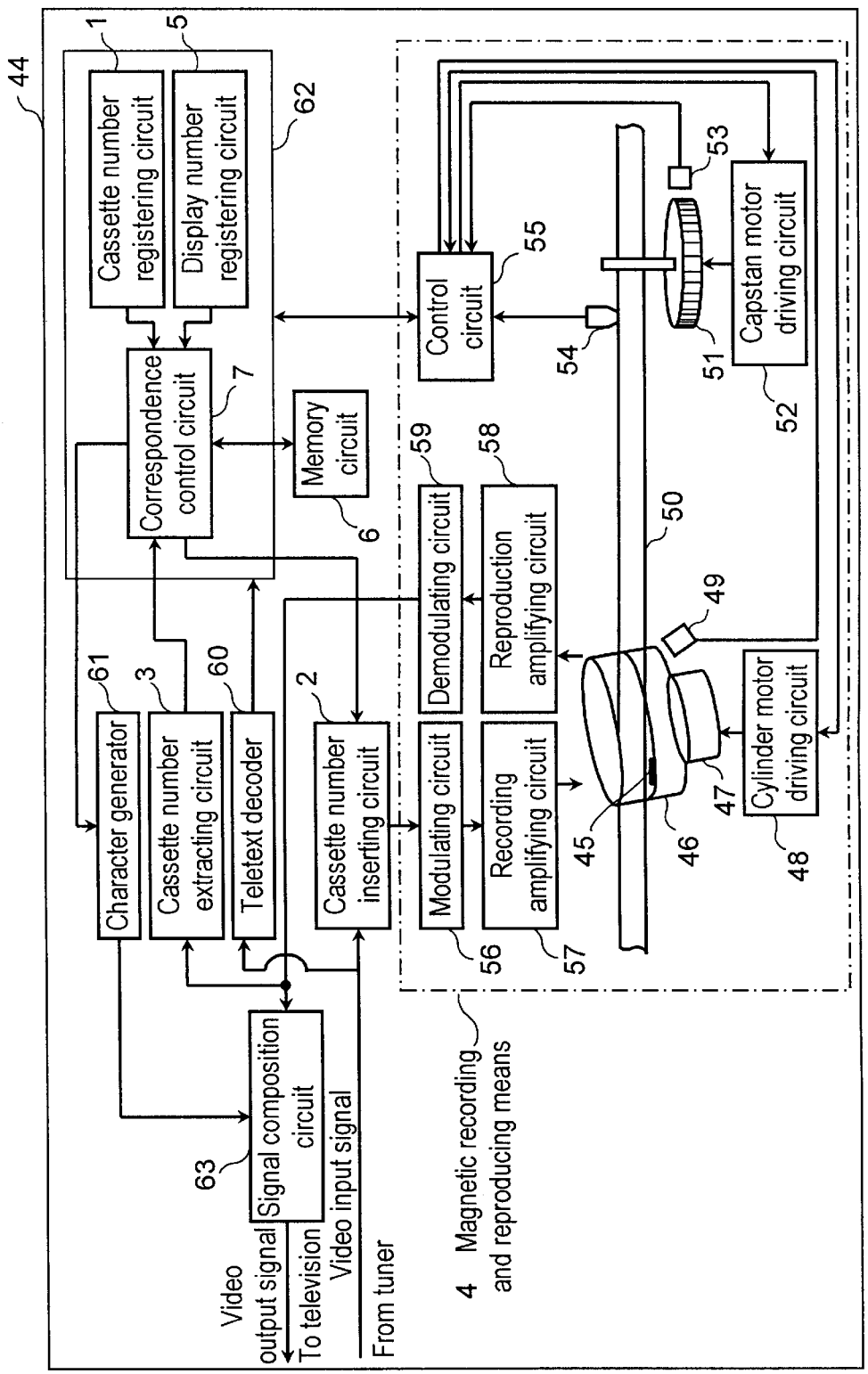
FIG. 5 shows the structure of a digital data recording and reproducing apparatus in the case of applying FIG. 1 to a VTR.

FIG. 5 shows the basic structure of a digital recording and reproducing apparatus in the case of applying FIG. 1 to a VTR. The operation of the driving components of the VTR 44 is described hereinafter.

For running a magnetic tape 50 on a video head 45, the hitherto known helical scanning system is applied. That is, the magnetic tape 50 is guided to run obliquely with a predetermined angle on the outer round surface of the rotating cylinder 46 in which a video head 45 is mounted.

In a driving unit comprising a cylinder motor 47, a cylinder motor driving circuit 48, a cylinder FG (frequency generator) 49 for detecting the rotating speed of the cylinder motor, a capstan motor 51, a capstan motor driving circuit 52 and a capstan FG 53 for detecting the rotating speed of the capstan motor, the cylinder motor 46 and the capstan motor 51 are controlled by a control circuit 55 as follows.

First, the control of the cylinder motor 47 is described hereinafter. In recording, a vertical sync signal of a video signal to be recorded or the related signal is fed into the control circuit 55, and, in reproduction, a signal having approximately the same frequency with that of reproduction is fed into the control circuit 55 as respective reference signals. Then the signal which is detected by the cylinder FG 49 is fed additionally into the control circuit 55 as a signal for comparison. From these signals, the control circuit 55 generates a servo signal which locks the phases of both signals, and the cylinder motor 48 is driven based on the servo signal. Also, at the occasion of recording, the above reference signal is recorded in the control track of the magnetic tape 50 through the control head 54 for the control of the capstan motor described below.

Next, the control of the capstan motor 51 is described hereinafter. In recording, the above reference signal and the signal detected by the capstan FG 53 are added in the control circuit 55 for obtaining a servo signal, then the servo signal is fed into the capstan motor 51 through the capstan motor driving circuit 52 for driving the capstan motor 51 under predetermined rotating speed. In reproduction, a servo signal is obtained by adding the above reference signal and a control signal reproduced from the control head 54 in the control circuit 55, then the servo signal thus obtained is fed into the capstan motor 51 through the capstan motor driving circuit 52 for driving the capstan motor 51 under the hitherto known tracking control.

The control circuit 55 performs also the switching of the modes of recording and reproduction for the magnetic recording and reproducing means 4.

Under the above operation, a digital data signal is given and received between the video head 45, and, the magnetic recording and reproducing means 4. The magnetic recording and reproducing means 4 comprises a modulation circuit 56 for modulating an analog video signal, a recording and amplifying circuit 57 for the signal from the modulation circuit 56, a reproducing and amplifying circuit 58 for the reproduced signal from the video head 45, and a demodulating circuit 59.

The VTR further comprises a built-in teletext decoder 60 for extracting a program title from teletext data in an analog video signal and sending the program title to a micro controller 62, a character generator 61 for converting a character signal into an analog video signal, and, a signal composition circuit 63 for synthesizing an analog video signal and a character signal. The micro-controller 62 comprises a cassette number registering circuit 1, a display number registering circuit 5, and a correspondence control circuit 7.

In recording, a CID is inserted into a VBI of an analog video signal by the cassette number inserting circuit 2, and recorded into the magnetic tape 50 of a cassette by the magnetic recording and reproducing means 4. At the end of recording, the display number registering circuit 5 searches out the smallest number from unused AIDs in the memory circuit 6, and applies the number as a new AID which corresponds the CID. Lastly the correspondence control circuit 7 adds the recorded program data into the storing circuit 6.

In reproduction, the cassette number extracting circuit 3 detects a CID existing in a VBI. When a CID is detected, the correspondence control circuit 7 searches out an AID corresponding to the CID from the memory circuit 6, and, displays the AID and the recorded program data under the AID on a television screen through the character generator 61.

When no CID is detected, the cassette number registering circuit 1 applies a new CID which is larger by one than the largest CID used in the past.

Figures 6, 7:
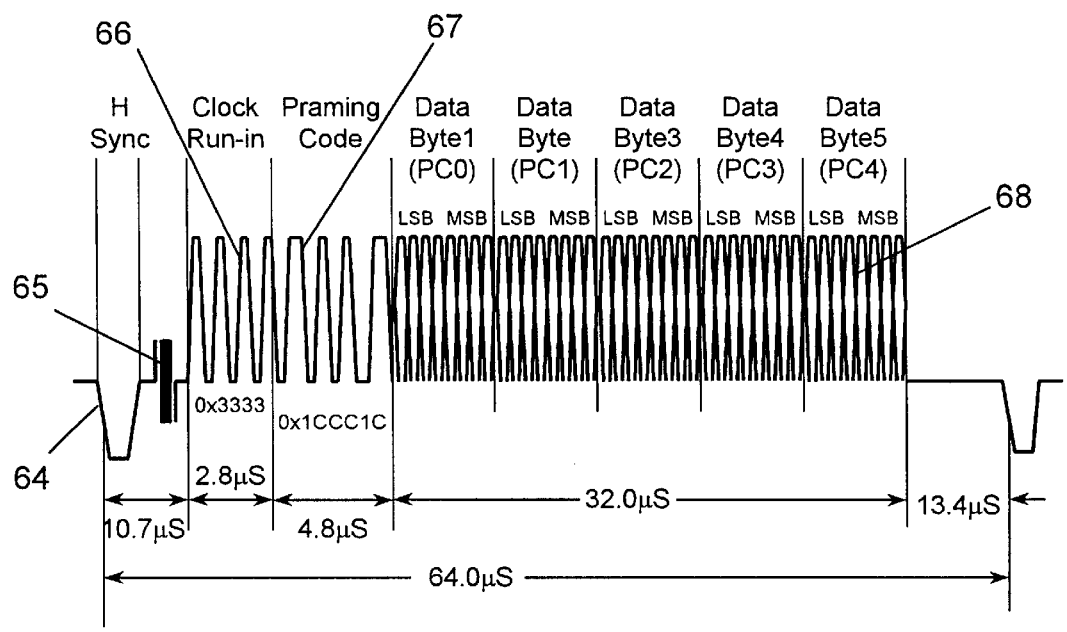
FIG. 6 shows the signal form of a digital signal recorded in a VBI in the first exemplary embodiment of the invention.
FIG. 7 shows an example of program data displayed on a television screen in the first exemplary embodiment of the invention.

FIG. 6 shows a signal form of a digital signal which is recorded in a horizontal scanning interval of a VBI. The digital signal comprises a horizontal sync signal (HSYNC) 64, a color burst signal 65, a clock run-in signal 66, a frame code signal 67 and a data signal 68 which is inserted into an analog video signal.

FIG. 7 shows an example of program data displayed on a television screen. From the display, a user can recognize a number "4", which is displayed as an AID, as a number for a cassette, and can see program titles and the respective recording start date, by which the user can recognize the existence of these data in the cassette of "No. 4".

As described above, in this exemplary embodiment, one each CID recorded in magnetic tape and one each AID which can be recognized by a user on a television screen are applied for each cassette so that the CID and the AID correspond each other. By applying different CIDs for respective cassettes, it is prevented that a plurality of cassettes have a same CID.

Also, when a user delete an AID which is registered for a cassette, the program data showing the recorded contents in the cassette under the AID is deleted from the memory circuit 6. And when a new cassette is used for recording a new program, a new CID which is larger by one than the largest CID used in the past is registered for the recording, and regarding an AID which corresponds to the new CID, the deleted AID can be used again because the smallest number is selected from unused AIDs. In general, smaller AID numbers are more convenient for a user.

Second Exemplary Embodiment

Figure 8:
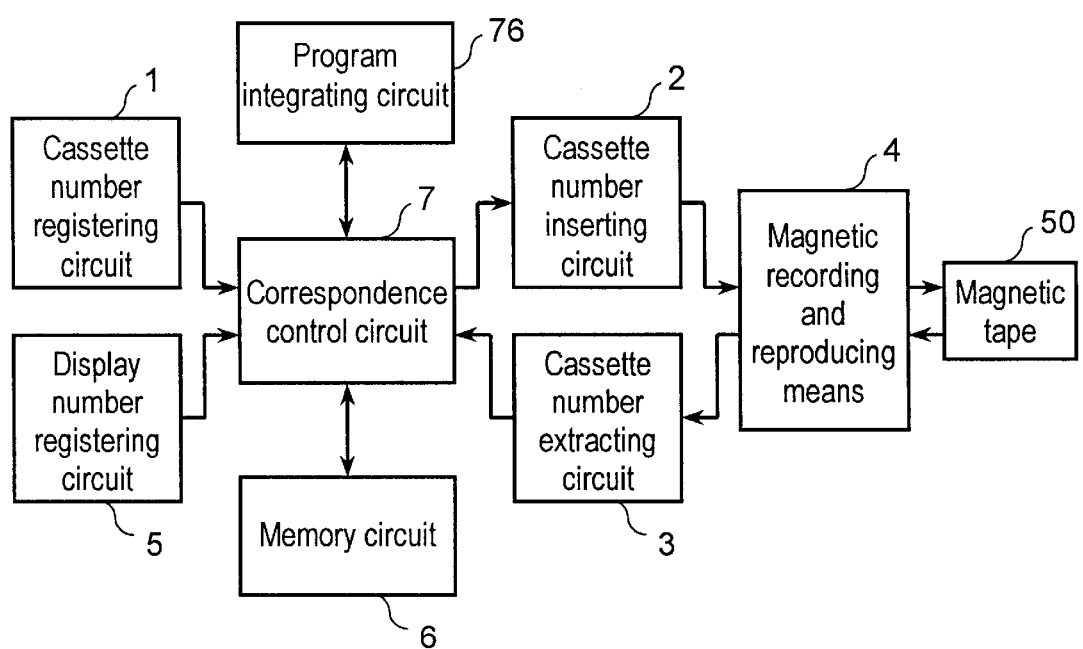
FIG. 8 is a block diagram showing the structure of a digital data recording and reproducing apparatus in a second exemplary embodiment of the invention.

FIG. 8 is a block diagram showing the structure of a digital data recording and reproducing apparatus in a second exemplary embodiment of the present invention. The apparatus comprises the cassette number registering circuit 1 for applying different cassette numbers for respective cassettes, the correspondence control circuit 7 for searching, adding and deleting program data, the cassette number inserting circuit 2 for inserting a CID in the form of a digital signal into a VBI, the cassette number extracting circuit 3 for extracting a CID from a VBI, the magnetic recording and reproducing means 4 (the recording and reproducing circuit and the drive, which is described in the first exemplary embodiment) for recording and reproducing an analog video signal by using the magnetic tape 50, the display number registering circuit 5 for applying an AID which corresponds to a CID and is recognized by a user, the memory circuit 6 for storing program data including a CID, an AID, starting tape position, an ending tape position, and recording start date, and program integrating circuit 76 which makes one AID corresponds to a plurality of CIDs, and, keeps the recorded programs having later recording date and deletes the recorded programs having older recording date when the recorded magnetic tape positions of the recorded programs under the plurality of CIDs overlap.

The above structure enables amendment when a plurality of CIDs are registered in one cassette by mistake. The example of the erroneous registration of CIDs is that a CID is erroneously read after inserting a cassette and the recording is performed in the erroneous state. In such case, the erroneous CID is registered in addition to a correct CID, by which a plurality of CIDs come to exist in one cassette. In integrating programs, a smaller AID is selected.

Figure 9:
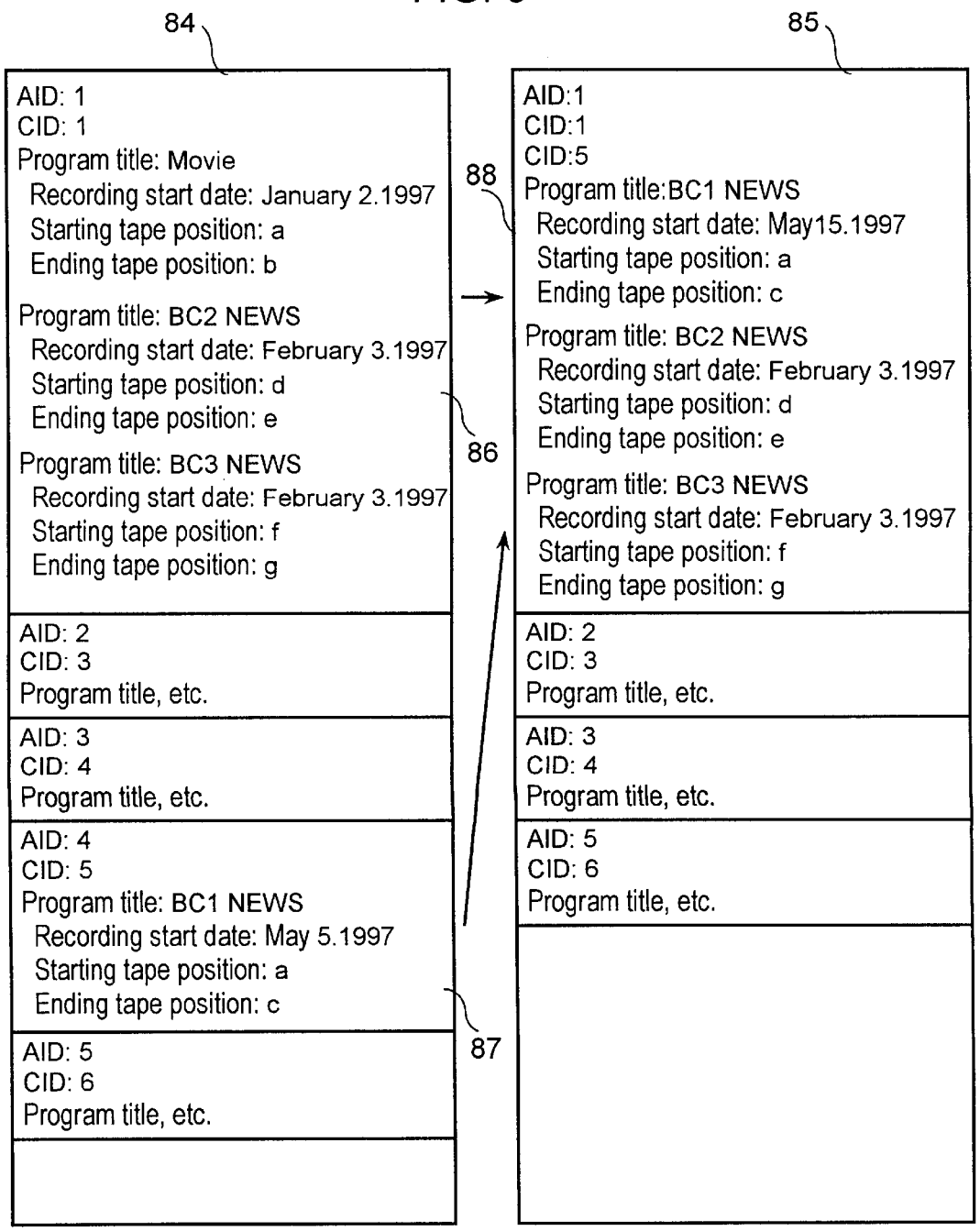
FIG. 9 shows the transition of the storing region of the memory circuit 6 in the occasion of program integration in the second exemplary embodiment of the invention, FIGS. 10A–10D for explanation of the operation of a program integrating circuit 76 in the second exemplary embodiment of the invention.

FIG. 9 shows the state of transition of the storing region of the memory circuit 6. That is, the program data 86 and 87 in a storing region 84 are integrated to program data 88 in a storing region 85. By the integration, the AID "4" of the program data 87 is deleted and a new program data is formed under the AID "1" of the program data 86.

More details of the operation is described hereinafter. The program data 86 has the data of AID: 1, CID: 1, program titles: Movie, BC2 NEWS and BC3 NEWS. Characters "a" through "g" stand for numerals showing the tape positions, and the values of the numerals are assumed to be smallest at the tape head and becomes larger toward the tape end, i.e., a<b<c<d<e<f<g. In "Movie", the recording start date is Jan. 2, 1997, the starting tape position is "a" and the ending tape position is "b". In "BC2 NEWS", the recording start date is Feb. 3, 1997, the starting tape position is "d" and the ending tape position is "e". In "BC3 NEWS", the recording start date is Feb. 3, 1997, the starting tape position is "f" and the ending tape position is "g". On the other hand, the program data 87 has the data of AID: 4, CID: 5, program title: BC1 NEWS, recording start date: May 15, 1997, starting tape position: "a" and ending tape position: "c". In the above case, "Movie" is overwritten by "BC1 NEWS" in the magnetic tape and does not exist anymore, and when the reproduction is kept running by the magnetic recording and reproducing means 4, the CIDs "1" and "5" can be detected by the cassette number extracting circuit 3, by which it is confirmed that a plurality of CIDs exist in one cassette.

The following is a description on the integration of the program 86 (AID: 1, CID: 1) and the program 87 (AID: 4, CID: 5) by the program integrating circuit 76. The integration is performed based on the starting tape position, the ending tape position and the recording start date in the magnetic tape 50. First, the overlapping of the programs is checked from the tape head of the magnetic tape 50. In "Movie", the starting tape position is "a" and the ending tape position is "b", and, in "BC1 NEWS", the beginning tape position is "a" and the ending tape position is "c", which means that there is the overlapping of the recorded magnetic tape positions between the two programs. In this case, the recording start date of the two programs are checked. The recording start date of "Movie" is Jan. 2, 1997, and that of "BC2 NEWS" is May 15, 1997, by which it is understood that "Movie" is overwritten by "BC2 NEWS" and no more exists because "BC2 NEWS" is recorded more recently. On the other hand, both "BC2 NEWS" and "BC3 NEWS" still exist because there is no overlapping in the magnetic tape between these.

By the above integration, the program data of "Movie" is deleted and replaced by the data of "BC1 NEWS" in the storing circuit 6, also the AID for "BC1 NEWS" is changed from "4" to "1". That is, a new program data 88 is formed, which has AID: 1, CID: 1 and 5, program title: BC1 NEWS, recording start date: May 15, 1997, starting tape position: a, ending tape position: c, program title: BC2 NEWS, recording start date: Feb. 3, 1997, starting tape position: d, ending tape position: e, and, program title: BC3 NEWS, recording start date: Feb. 3, 1997, starting tape position: f, ending tape position: g.

The operation of the program integration circuit 76 is further described referring to FIG. 10. FIG. 10(a) shows the contents of the program data 86 of FIG. 9, i.e., the starting tape positions and the ending tape positions of the respective programs are schematically shown by a tape 78. FIG. 10(b) shows the contents of the program data 87 of FIG. 9, i.e., the starting tape position and the ending tape position of the program is schematically shown by a tape 79. FIG. 10(c) shows the contents of the program data 88 of FIG. 9, i.e., the starting tape positions and the ending tape positions of the programs are schematically shown by a tape 80. FIG. 10(d)-83 shows an example of displaying the program data 88 of FIG. 9 on a television screen. As schematically shown by FIG. 10(c), the programs data after the integration are recorded in the storing circuit 6 in the order of "BC1 NEWS", "BC2 NEWS", "BC3 NEWS", which corresponds to the program data recorded in the magnetic tape 50.

Figure 11:
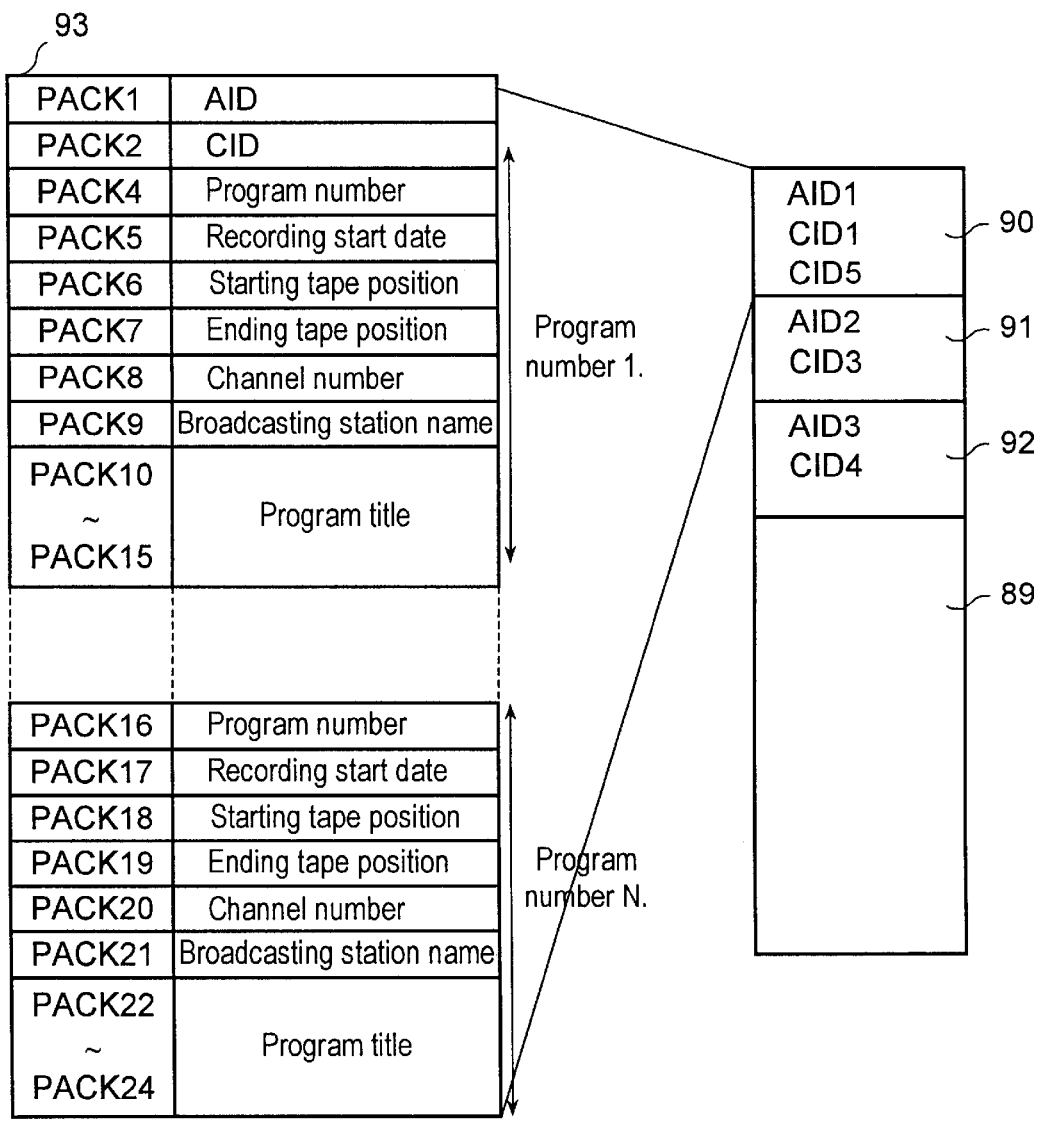
FIG. 11 shows the structure of stored data in the memory circuit 6 in the second exemplary embodiment of the invention.

FIG. 11 shows the storing structure in the memory circuit 6 after the integration in the second exemplary embodiment. In a storing region 89, an integrated program 90 and the other programs 91 and 92 are stored. Program details 93 show the contents of the program 90, in which CID "1" and "5" exist under AID "1". As a result, the programs under CID "1" and "2", which are detected from the magnetic tape during reproduction, can be searched out by AID "1".

Figure 12:
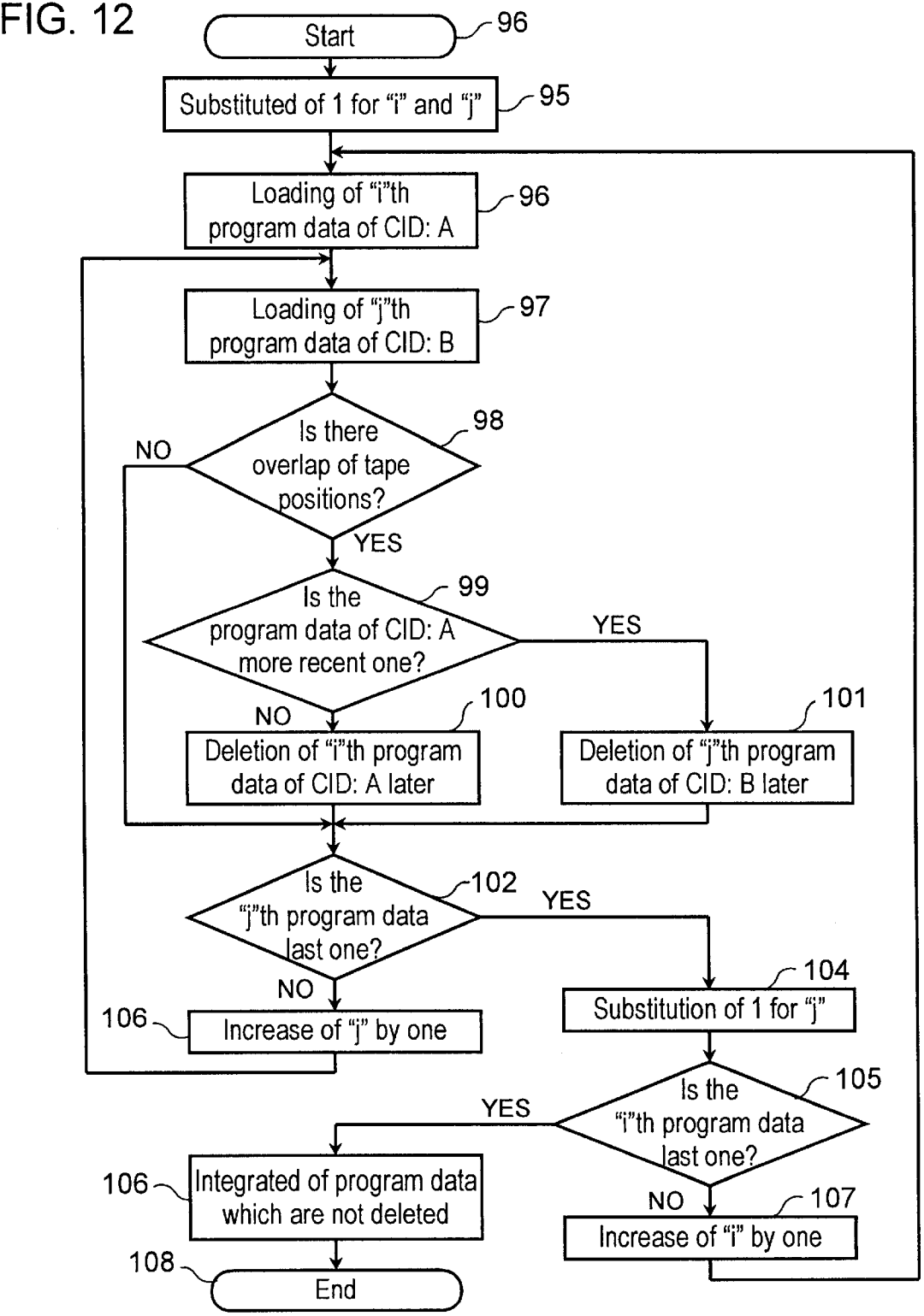
FIG. 12 is a flow chart showing the processes of integrating the program data under a plurality of CIDs (cassette identification numbers) in the second exemplary embodiment of the invention.

FIG. 12 is a flow chart showing processes of integrating programs under the plurality of CIDs. In FIG. 12, "A" and "B" represent two different CIDs. It starts from process 94. In process 95, "1" is substituted for "i" and "j". In process 96, "i"th program of CID: A is loaded. Then in process 97, "j"th program of CID: B is loaded. Then in process 98, it is checked whether there is overlapping of recorded magnetic tape positions from the tape position data of both programs. If there is the overlapping, it is checked, in process 99, which program is more recently recorded, from the recording start date of respective programs. If the "i"th program data of CID: A is more recently recorded, the "j"th program data of CID: B is deleted later (process 101). If the "j"th program data of CID: B is more recently recorded, the "i"th program data of CID: A is deleted later (process 100). Next, in process 102, if the "j"th program data of CID: B is not the last one, "j" is increased by one (process 103) and it returns to process 97. If the "j"th program data of CID: B is the last one, "1" is substituted for "j" (process 104). In process 105, if the "i"th program data of CID: A is not the last one, "i" is increased by one (process 107) and it return to process 96. If the "i"th program data of CID: A is the last one, the program data which are not deleted in the above processes are integrated in the order of positions in the magnetic tape (process 106). With the above processes, the integration is completed (process 108).

Figure 13:
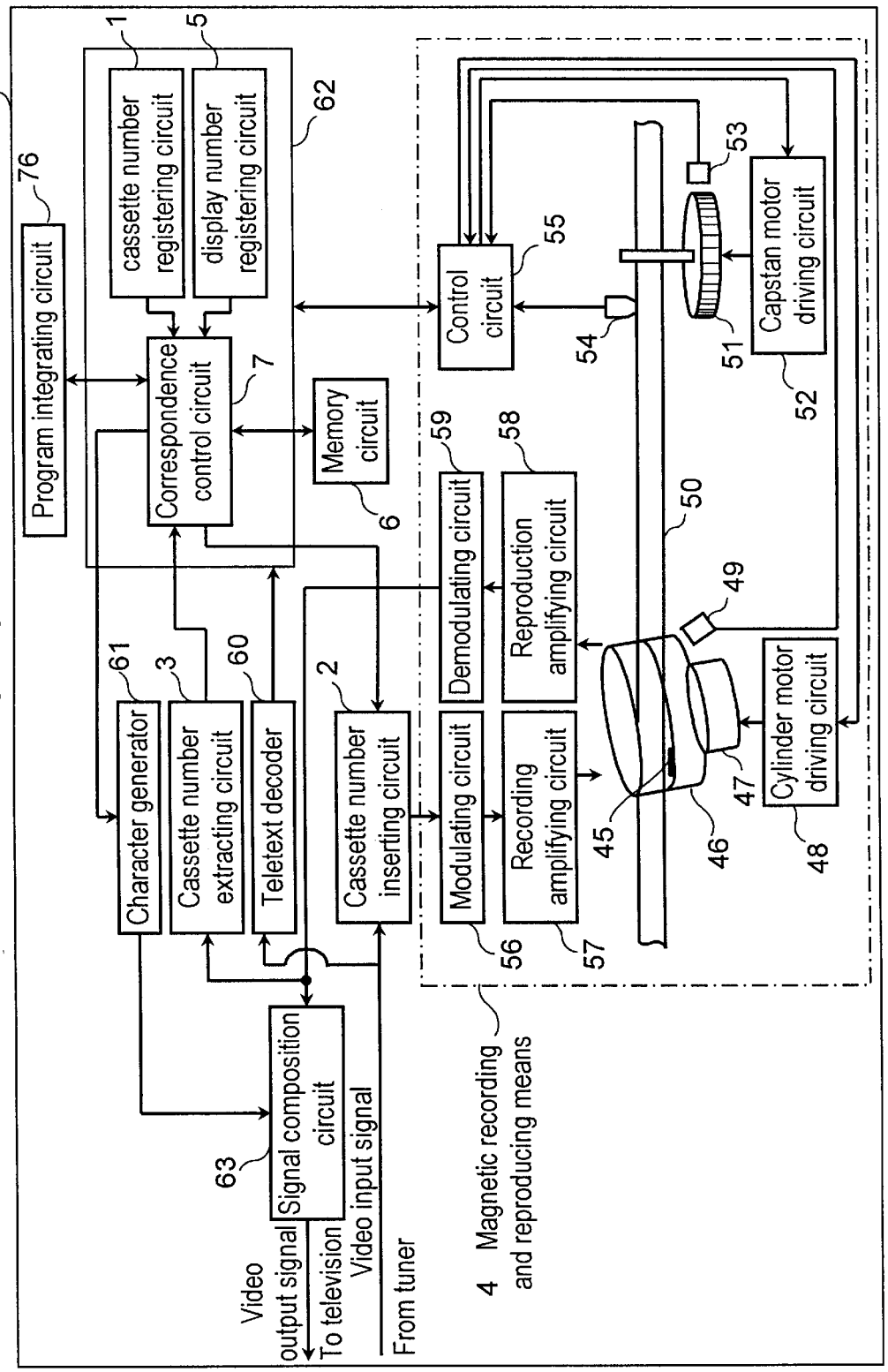
FIG. 13 shows the structure of a digital data recording and reproducing apparatus in the case of applying FIG. 8 to a VTR.
Figure 14:
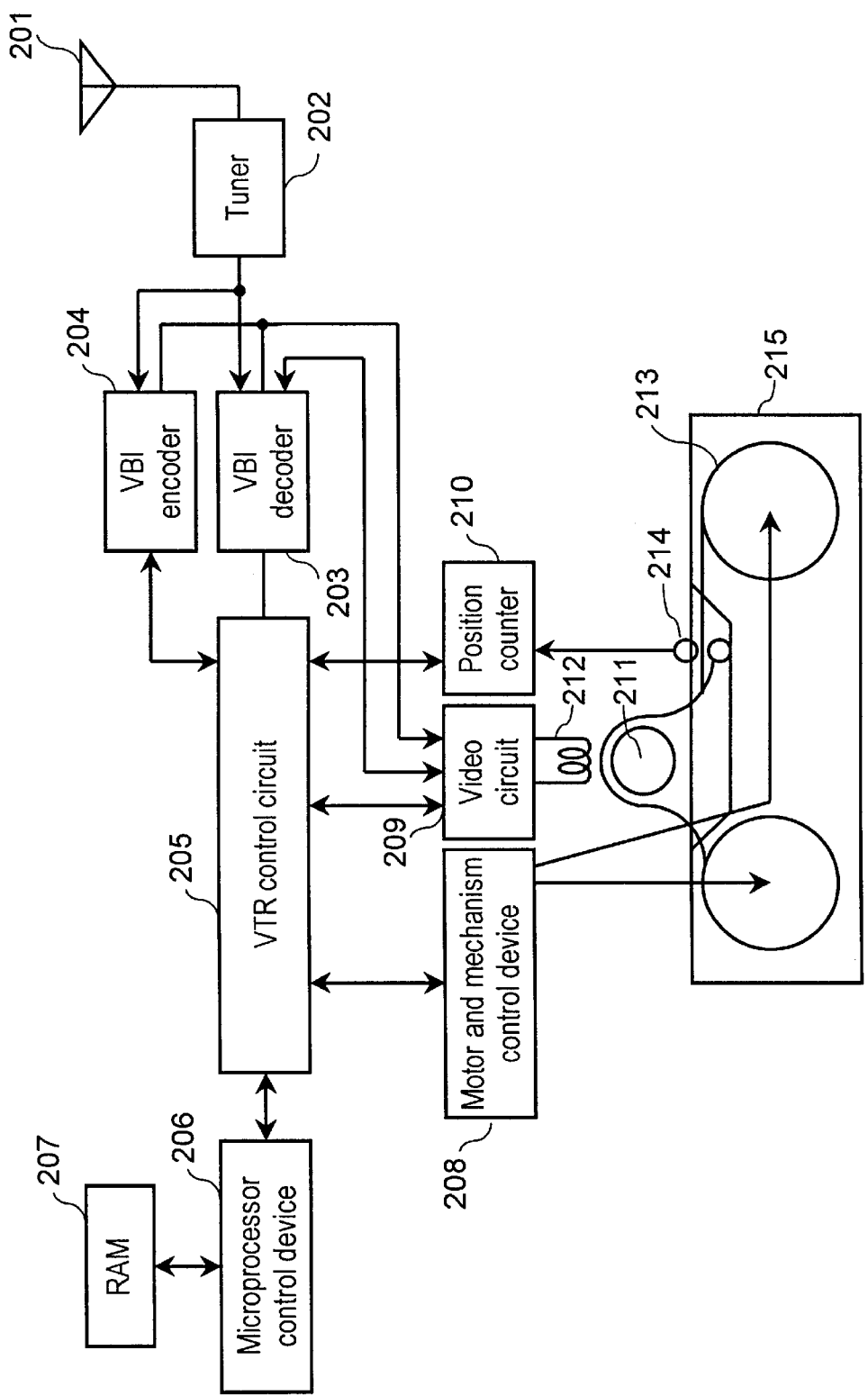
FIG. 14 is a block diagram showing the structure of a conventional digital data recording and reproducing apparatus, and FIGS. 15A–15B for explanation of a conventional signal recorded in a VBI.
Figure 15A:
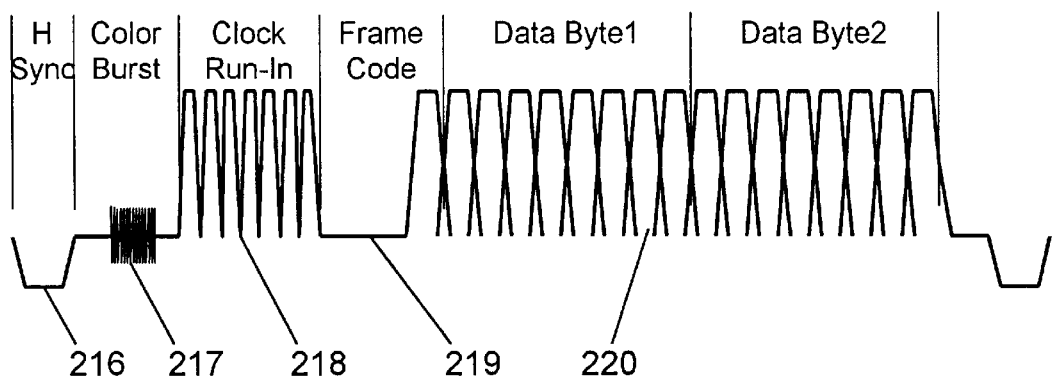
Figure 15B:
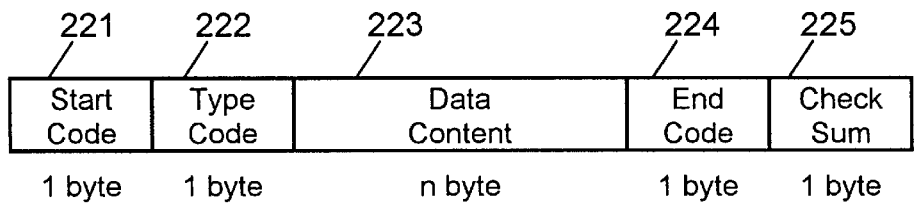

FIG. 13 shows the structure of a digital recording and reproducing apparatus in the case of applying FIG. 8 to a VTR. For the components which are the same as in FIG. 5 of the first exemplary embodiment, the same reference numerals are applied and the description on the operation of these components are omitted.

In reproduction, a CID existing in a VBI is detected by the cassette number extracting circuit 3. When the CID is detected, the correspondence control circuit 7 searches out an AID corresponding to the CID from the memory circuit 6, and displays the AID and the recorded program data under the AID on a television screen through the character generator 61, by which a user can check program contents recorded in the cassette.

In recording, a CID is inserted to the VBI of an analog video signal by the cassette number inserting circuit 2.

If no CID exists in the magnetic tape 50, the cassette number registering circuit 1 applies a new CID which is larger by one than the CIDs used in the past. During recording, the CID is inserted into the VBI of an analog video signal by the cassette number inserting circuit 2, and recorded into the magnetic tape 50 by the magnetic recording and reproducing means 4. At the end of recording, the display number registering circuit 5 searches out the smallest number from unused AIDs in the storing circuit 6 and applies the number as a new AID which corresponds to the new CID. And the correspondence control circuit 7 adds the recorded program data under the new AID into the memory circuit 6.

When a plurality of CIDs are detected in one cassette by the cassette number extracting circuit 3 during reproduction on the magnetic tape 50 by the magnetic recording and reproducing means 4, the integration of programs can be performed by the program integrating circuit 76 as described above.

As described above, in the second exemplary embodiment, even when a plurality of CIDs are recorded in one cassette by mistake, one AID is applied for the plurality of CIDs, and programs under the plurality of CIDs can be integrated.

Furthermore, since the integration is performed by the VTR automatically, the user feel no inconvenience for the integration.

In the above exemplary embodiments, the description is carried out by using an analog video signal and the VBI of the analog video signal for inserting character data inserting region. However, the same effect can be obtained by using a digital video signal and the region in which the character data can be inserted in the digital video signal.

What is claimed is:

1. A digital data recording and reproducing apparatus comprising:

(a) magnetic recording and reproducing means for recording and reproducing a video signal by using a magnetic tape set in a cassette;

(b) cassette number registering means for applying different cassette numbers for respective cassettes;

(c) display number registering means for selecting a smallest number from unused display numbers and applying said selected number as a new display number which corresponds to a cassette number, wherein said display number is a number recognized by a user;

(d) cassette number extracting means for extracting a cassette number from the character data inserting region of the video output signal of said magnetic recording and reproducing means;

(e) memory means for storing program data including a cassette number and a display number;

(f) correspondence control means for giving and receiving program data to and from said storing means for searching, adding and deleting program data originated from said cassette number registering means, said display number registering means and said cassette number extracting means; and (g) cassette number inserting means for inserting a cassette number in the form of a digital signal into the character data inserting region of a video signal for feeding the signal of said cassette number into said magnetic recording and reproducing means.

2. A digital data recording and reproducing apparatus comprising:
   (a) magnetic recording and reproducing means for recording and reproducing a video signal by using a magnetic tape set in a cassette;
   (b) cassette number registering means for applying different cassette numbers for respective cassettes;
   (c) display number registering means for applying a display number which corresponds to a cassette number, wherein said display number is a number recognized by a user;
   (d) cassette number extracting means for extracting a cassette number from the character data inserting region of the video output signal of said magnetic recording and reproducing means;
   (e) memory means for storing program data including a cassette number, a display number, recording starting and ending positions in a magnetic tape, and recording start date;
   (f) program integrating means which makes one display number corresponds to a plurality of cassette numbers, and, keeps recorded programs having later date and deletes recorded programs having older date when the recorded magnetic tape positions of said recorded programs under said plurality of cassette numbers overlap;
   (g) correspondence control means for giving and receiving program data to and from said storing means and said program integrating means for searching, adding and deleting program data originated from said cassette number registering means, said display number registering means and said cassette number extracting means; and
   (h) cassette number inserting means for inserting a cassette number in the form of a digital signal into the character data inserting region of a video signal for feeding the signal of said cassette number into said magnetic recording and reproducing means.

* * * * *